(12) United States Patent
Kim

(10) Patent No.: US 12,298,931 B2
(45) Date of Patent: May 13, 2025

(54) HOST DEVICE COMMUNICATING WITH ELECTRONIC DEVICE AND COMMUNICATION METHOD OF HOST DEVICE

(71) Applicant: Samsung Electronics Co., Ltd., Suwon-si (KR)

(72) Inventor: Kyungsik Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 69 days.

(21) Appl. No.: 18/323,819

(22) Filed: May 25, 2023

(65) Prior Publication Data

US 2023/0297536 A1 Sep. 21, 2023

Related U.S. Application Data

(63) Continuation of application No. PCT/KR2021/014132, filed on Oct. 13, 2021.

(30) Foreign Application Priority Data

Nov. 27, 2020 (KR) .................. 10-2020-0163335

(51) Int. Cl.
  *G06F 13/42* (2006.01)
  *G06F 13/38* (2006.01)
(52) U.S. Cl.
  CPC ........ *G06F 13/4282* (2013.01); *G06F 13/382* (2013.01); *G06F 2213/0042* (2013.01)
(58) Field of Classification Search
  None
  See application file for complete search history.

(56) References Cited

U.S. PATENT DOCUMENTS 7,222,201 B2   5/2007  Augustin et al.
8,131,890 B1   3/2012  Bajpai
(Continued)

FOREIGN PATENT DOCUMENTS

CN    103514119 A   1/2014
JP    2017033588 A  2/2017
(Continued)

OTHER PUBLICATIONS

International Search Report, with the English Translation and Written Opinion of the ISA for PCT/KR2021/014132 mailed Jan. 14, 2022, 13 pages.

*Primary Examiner* — Farley Abad
*Assistant Examiner* — Dayton Lewis-Taylor
(74) *Attorney, Agent, or Firm* — Nixon & Vanderhye, P.C.

(57) ABSTRACT

An example host device for communicating with an electronic device includes a plurality of communication interfaces including a plurality of universal serial bus (USB) host controllers to communicate with the electronic device through a plurality of USB buses; a memory; and a processor. The processor is configured to obtain, from the plurality of USB host controllers, information about a plurality of physical endpoints that each of the plurality of USB host controllers uses for communication, configure one or more logical endpoints, based on the information about the plurality of physical endpoints, and perform communication with the electronic device through the plurality of physical endpoints of the plurality of USB host controllers by controlling the plurality of USB host controllers through the logical endpoints.

15 Claims, 13 Drawing Sheets

(56) References Cited

U.S. PATENT DOCUMENTS

| | | | |
|---|---|---|---|
| 8,578,195 B2 * | 11/2013 | Park | G06F 1/3293 |
| | | | 713/323 |
| 9,148,321 B2 | 9/2015 | Shin | |
| 10,164,888 B2 | 12/2018 | Schneider et al. | |
| 2009/0327536 A1 | 12/2009 | Solomon et al. | |
| 2013/0254263 A1 | 9/2013 | Kwon et al. | |
| 2014/0280960 A1 * | 9/2014 | Paramasivam | G06F 9/4413 |
| | | | 709/226 |
| 2015/0026369 A1 | 1/2015 | Wen et al. | |
| 2020/0112331 A1 | 4/2020 | Shimura et al. | |

FOREIGN PATENT DOCUMENTS

| | | | |
|---|---|---|---|
| JP | 2017059991 A | 3/2017 | |
| JP | 2018207325 A | 12/2018 | |
| JP | 2019020851 A | 2/2019 | |
| KR | 100449080 B1 | 9/2004 | |
| KR | 101284616 B1 | 7/2013 | |
| KR | 20130107618 A | 10/2013 | |
| KR | 20160020539 A | 2/2016 | |
| KR | 101931566 B1 | 12/2018 | |
| KR | 102018666 B1 | 9/2019 | |

* cited by examiner

HOST DEVICE COMMUNICATING WITH ELECTRONIC DEVICE AND COMMUNICATION METHOD OF HOST DEVICE

CROSS-REFERENCE TO RELATED APPLICATIONS

This application is a continuation of International Application No. PCT/KR2021/014132, designating the United States, filed Oct. 13, 2021, in the Korean Intellectual Property Receiving Office, which claims priority to Korean Patent Application No. 10-2020-0163335, filed Nov. 27, 2020, in the Korean Intellectual Property Office. The contents of each of these applications are incorporated herein in their entireties.

BACKGROUND

Field

The disclosure relates to a host device communicating with an electronic device, and a communication method of the host device.

Description of Related Art

Universal Serial Bus (USB) is an input/output protocol used to connect devices to one another. USB may generally be used by one host device to support a plurality of peripheral devices. One host device controls a plurality of peripheral devices and shares data communication bandwidth with all of the peripheral devices.

In order for a host device to be guaranteed a maximum bandwidth of data transmitted and received through USBs, one host device must be configured to be connected to one device in a 1:1 connection method.

Due to the convenience of system design and device compatibility, USB is used as an interface for device connection in many systems. USB protocols may be classified into USB 1.0 supporting a bandwidth of 12 Mbps, USB 2.0 supporting a bandwidth of 480 Mbps, USB 3.0 supporting a maximum of 5 Gbps, and USB 3.1 supporting a maximum of 10 Gbps, according to supported bandwidths. In this case, because the bandwidths of devices connected to the host device are limited according to bandwidths supported by the host device, the host device must be designed according to a USB protocol suitable for the respective maximum bandwidths of devices to which the host device is connected.

SUMMARY

Example embodiments can provide a host device for improving a data transmission bandwidth and reducing a data transmission delay time between the host device and an electronic device, and a communication method of the host device.

According to an example embodiment, a host device that communicates with an electronic device may include a plurality of communication interfaces including a plurality of universal serial bus (USB) host controllers to communicate with the electronic device through a plurality of USB buses; a memory including one or more instructions; and a processor configured to execute the one or more instructions stored in the memory. The processor is configured to execute the one or more instructions to obtain, from the plurality of USB host controllers, information about a plurality of physical endpoints that each of the plurality of USB host controllers uses for communication, configure one or more logical endpoints based on the information about the plurality of physical endpoints, wherein the logical endpoints are configured such that at least one logical endpoint is mapped to the plurality of physical endpoints including at least one physical endpoint that each of two or more different USB host controllers uses, and perform communication with the electronic device through the plurality of physical endpoints of the plurality of USB host controllers by controlling the plurality of USB host controllers through the logical endpoints.

In an example embodiment, the processor may be further configured to configure a different number of logical endpoints than the plurality of physical endpoints based on the information about the plurality of physical endpoints, so that the plurality of USB host controllers and one predetermined application can communicate with each other through the logical endpoints, combine data respectively received from the plurality of USB host controllers through the plurality of physical endpoints with each other and transmit a result of the combining to the predetermined application through the logical endpoints, or multiplex data received from the predetermined application through the logical endpoints and transmit a result of the multiplexing to the plurality of USB host controllers through the plurality of physical endpoints.

In an example embodiment, the processor may be further configured to identify the plurality of USB host controllers connected to the electronic device through the plurality of USB buses, and obtain, from the identified plurality of USB host controllers, information about at least one physical endpoint that each of the plurality of USB host controllers uses for communication.

In an example embodiment, when configuring the logical endpoints based on the information about the plurality of physical endpoints, the processor may be further configured to configure the logical endpoints such that physical endpoints having the same transmission directions and the same transmission types among the physical endpoints used by the two or more different USB host controllers are mapped to one logical endpoint.

In an example embodiment, the plurality of USB host controllers may respectively assign frame numbers to data output through one or more physical endpoints at predetermined time intervals, and the processor may be further configured to obtain a frame number difference between the data respectively received from the plurality of USB host controllers, correct the frame numbers assigned to the data respectively received from the plurality of USB host controllers, based on the frame number difference, and combine the data respectively received through the physical endpoints of the plurality of USB host controllers with each other and output a result of the combining to the logical endpoints, according to a sequence determined based on the corrected frame numbers.

In an example embodiment, the processor may be further configured to receive data composed of a plurality of packets from the electronic device through each of the plurality of USB host controllers, obtain frame numbers assigned to the data from Start Of Frame (SoF) packets included in the plurality of packets at predetermined time intervals, and obtain, from data packets included between the SoF packets, information about one or more physical endpoints to which the data packets are transmitted, and arrange and output the data packets based on the frame numbers, through a logical endpoint to which the one or more physical endpoints are mapped.

In an example embodiment, the predetermined application may include a main driver configured to control communication according to a USB protocol, and the processor may be further configured to configure the logical endpoints based on the information about the plurality of physical endpoints and control a gadget driver so that the plurality of USB host controllers communicate with the main driver through the logical endpoints, so that the main driver operates as if communicating with the electronic device through one USB bus.

In an example embodiment, the processor may be further configured to configure the one or more logical endpoints according to a transmission bandwidth or the amount of transmission data.

In an example embodiment, a method, performed by a host device, of performing communication with an electronic device may include connecting with the electronic device through a plurality of USB buses; obtaining information about a plurality of physical endpoints that each of the plurality of USB host controllers uses for communication, from the plurality of USB host controllers connected with the plurality of USB buses; configuring one or more logical endpoints based on the information about the plurality of physical endpoints, wherein the logical endpoints are configured such that at least one logical endpoint is mapped to the plurality of physical endpoints including at least one physical endpoint that each of two or more different USB host controllers uses; and performing communication with the electronic device through the plurality of physical endpoints of the plurality of USB host controllers by controlling the plurality of USB host controllers through the logical endpoints.

In an example embodiment, the configuring of the one or more logical endpoints may include configuring a different number of logical endpoints than the plurality of physical endpoints based on the information about the plurality of physical endpoints, so that the plurality of USB host controllers and one predetermined application can communicate with each other through the logical endpoints. The performing of the communication with the electronic device may include combining data respectively received from the plurality of USB host controllers through the plurality of physical endpoints with each other and transmitting a result of the combining to the predetermined application through the logical endpoints; and multiplexing data received from the predetermined application through the logical endpoints and transmitting a result of the multiplexing to the plurality of USB host controllers through the plurality of physical endpoints.

In an example embodiment, the obtaining of the information about the plurality of physical endpoints may include identifying the plurality of USB host controllers connected to the electronic device through the plurality of USB buses; and obtaining, from the identified plurality of USB host controllers, information about at least one physical endpoint that each of the plurality of USB host controllers uses for communication.

In an example embodiment, the configuring of the logical endpoints may include configuring the logical endpoints such that physical endpoints having the same transmission directions and the same transmission types among the physical endpoints used by the two or more different USB host controllers are mapped to one logical endpoint.

In an example embodiment, the method may further include assigning a frame number to data output through one or more physical endpoints, at predetermined time intervals, wherein the assigning is performed by each of the plurality of USB host controllers; and obtaining a frame number difference between the data respectively received from the plurality of USB host controllers. The performing of the communication with the electronic device may include correcting the frame numbers assigned to the data respectively received from the plurality of USB host controllers, based on the frame number difference; and combining the data respectively received through the physical endpoints of the plurality of USB host controllers with each other and outputting a result of the combination to the logical endpoints, according to a sequence determined based on the corrected frame numbers.

In an example embodiment, the obtaining of the information about the plurality of physical endpoints may include receiving data composed of a plurality of packets from the electronic device through each of the plurality of USB host controllers; obtaining frame numbers assigned to the data from Start Of Frame (SoF) packets included in the plurality of packets at predetermined time intervals; and obtaining, from data packets included between the SoF packets, information about one or more physical endpoints to which the data packets are transmitted. The performing of the communication with the electronic device may include arranging and outputting the data packets based on the frame numbers, through a logical endpoint to which the one or more physical endpoints are mapped.

In an example embodiment, the predetermined application may include a main driver configured to control communication according to a USB protocol, and the performing of the communication with the electronic device may include controlling a gadget driver so that the plurality of USB host controllers communicate with the main driver through the logical endpoints. The main driver may operate as if communicating with the electronic device through one USB bus.

In an example embodiment, the configuring of the logical endpoints may include configuring the logical endpoints according to a transmission bandwidth or the amount of transmission data.

In an example embodiment, a non-transitory computer-readable recording medium has stored therein a program, which, when executed by a computer, performs a method, performed by a host device, of performing communication with an electronic device, the method including connecting with the electronic device through a plurality of USB buses; obtaining information about a plurality of physical endpoints that each of the plurality of USB host controllers uses for communication, from the plurality of USB host controllers connected with the plurality of USB buses; configuring one or more logical endpoints based on the information about the plurality of physical endpoints, wherein the logical endpoints are configured such that at least one logical endpoint is mapped to the plurality of physical endpoints including at least one physical endpoint that each of two or more different USB host controllers uses; and performing communication with the electronic device through the plurality of physical endpoints of the plurality of USB host controllers by controlling the plurality of USB host controllers through the logical endpoints.

BRIEF DESCRIPTION OF THE DRAWINGS

The above and/or other aspects of the disclosure will be more apparent by describing certain embodiments of the disclosure with reference to the accompanying drawings, in which.

DETAILED DESCRIPTION

Figure 1:
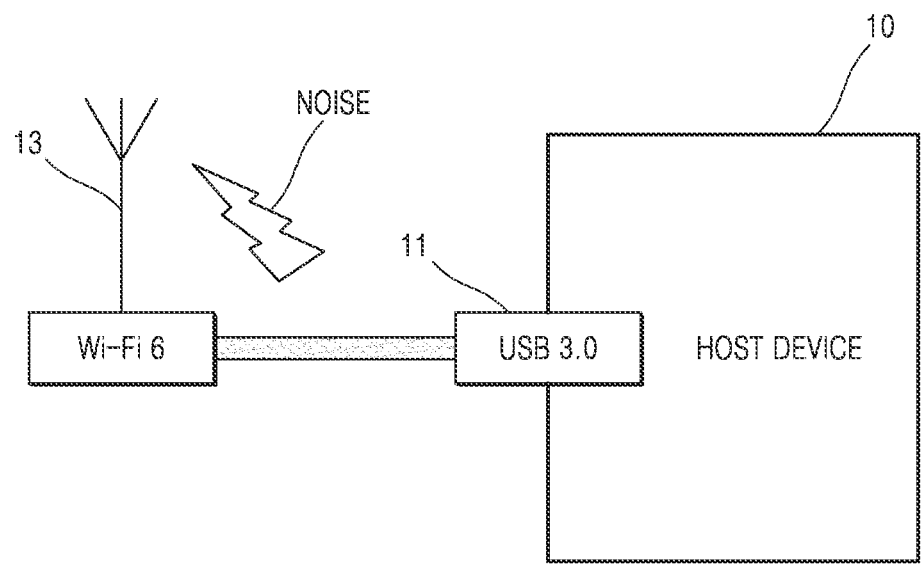
FIG. 1 is a diagram for explaining radio frequency interference occurring when a host device is connected to a Wi-Fi device using a USB 3.0 bus.

Embodiments of the disclosure are described in detail herein with reference to the accompanying drawings so that this disclosure may be easily performed by one of ordinary skill in the art to which the disclosure pertains. The disclosure may, however, be embodied in many different forms and should not be construed as being limited to the examples set forth herein. In the drawings, parts irrelevant to the description are omitted for simplicity of explanation, and like numbers refer to like elements throughout.

Embodiments of the disclosure may be described in terms of functional block components and various processing steps. Some or all of these functional blocks may be implemented using various numbers of hardware and/or software configurations that perform specific functions. For example, the functional blocks of the disclosure may be implemented by one or more microprocessors, or by circuit configurations for a certain function. For example, the functional blocks of the disclosure may be implemented in various programming or scripting languages. The functional blocks may be implemented as algorithms executed in one or more processors. The disclosure may employ conventional art for electronic configuration, signal processing, and/or data processing, for example.

In addition, connecting lines or connecting members between the components shown in the drawings are only example functional connections and/or physical or circuit connections. Connections between components may be represented by many alternative or additional functional relationships, physical connections or logical connections in a practical device.

Embodiments of the disclosure will now be described more fully with reference to the accompanying drawings.

A universal serial bus (USB) is a standard related to connectors, cables, and protocols for connecting a peripheral device to a host device, and has an advantage of being a technology capable of both power supply and data communication. USB protocols may be classified into USB 1.0 supporting a bandwidth of 12 Mbps, USB 2.0 supporting a bandwidth of 480 Mbps, USB 3.0 supporting a maximum of 5 Gbps, and USB 3.1 supporting a maximum of 10 Gbps, according to supported bandwidths.

Real-time data, such as audio data, may be transmitted using an isochronous method when being transmitted using USB 2.0. The isochronous method is a transmission method in which handshake for data is not checked and retransmission is not supported.

A device supporting an isochronous transmission method using USB 2.0 may transmit a predetermined number of packets or fewer supporting periodic transfer within one micro-frame of 125 μsec (microsecond). For example, a device supporting the isochronous transmission method using USB 2.0 may guarantee transmission of one to three 512-byte packets per micro frame according to the specifications of a host controller of a reception terminal. When one to three 512-byte packets can be transmitted per microframe, real-time characteristics of single-channel audio data may be guaranteed. However, because there is a limit on the number of packets that may be transmitted per microframe, transmission delay may occur in the case of multi-channel audio data such as 5.1-channel audio data or 7.1-channel audio data.

A communication method using USB 3.0 provides a high speed of 5 Gbps and convenience of system configuration. However, USB 3.0 can cause radio frequency interference with a device operating in a 2.4 GHz band due to its frequency characteristics. When radio frequency interference occurs, devices using the 2.4 GHz band may enter an inoperable state or their performance may be rapidly limited.

Figure 2:
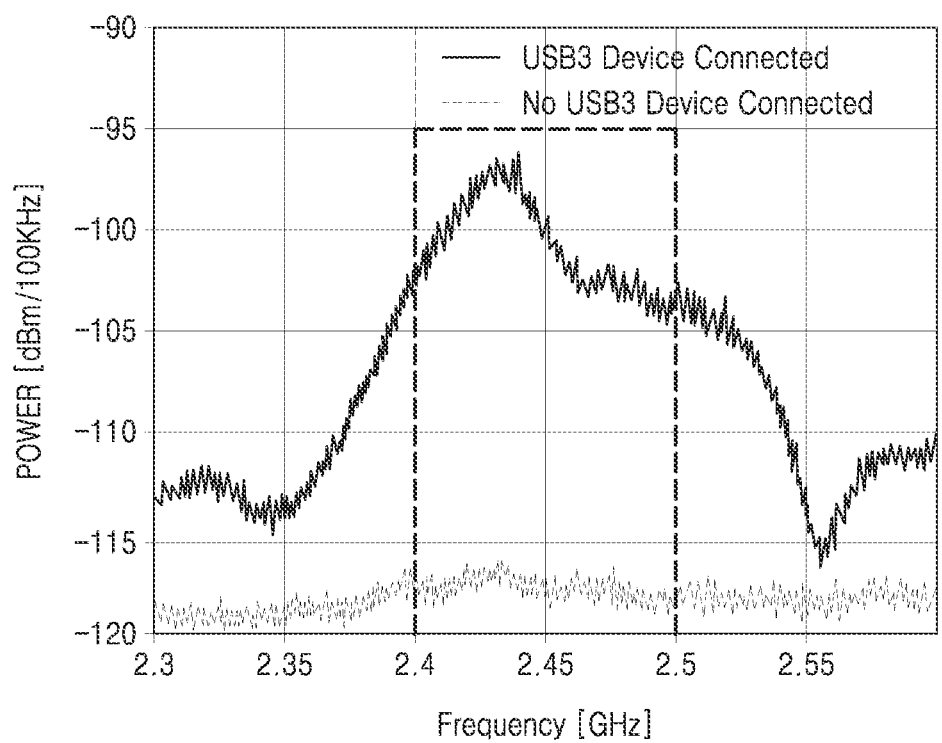
FIG. 2 is a diagram for explaining radio frequency interference occurring when a host device is connected to a Wi-Fi device using a USB 3.0 bus.

FIGS. 1 and 2 are diagrams for explaining radio frequency interference occurring when a host device is connected to a Wi-Fi device using a USB 3.0 bus.

A wireless communication method (i.e., Wi-Fi 5) according to the IEEE 802.11ac standard is a method using a frequency of a bandwidth (20 MHz to 160 MHz) in a 5 GHz band. Although Wi-Fi 5 does not use the 2.4 GHz band, the transmission power is weak, so the coverage is narrow and a link speed is not properly utilized due to technical limitations. A wireless communication method (hereinafter referred to as Wi-Fi 6) based on the IEEE 802.11ax standard developed later guarantees a high transmission rate and coverage by using 5 GHz and 2.4 GHz.

However, as shown in FIG. 1, a device 13 using Wi-Fi 6 is connected to a host device 10 through a USB 3.0 bus 11, and, when the antenna of the device 13 using Wi-Fi 6 is located near the USB 3.0 bus, radio interference in the 2.4 GHz band may occur between the antenna and the USB 3.0 bus.

FIG. 2 shows an example of noise powers measured when the device 13 using Wi-Fi 6 is connected to the host device 10 through the USB 3.0 bus 11 and when the device 13 using Wi-Fi 6 is not connected to the host device 10. As shown in FIG. 2, when the device 13 using Wi-Fi 6 is connected through the USB 3.0 bus 11, it can be seen that a large noise power is measured in the 2.4 GHz band.

Thus, when a Wi-Fi 6 device is connected to a host device through a USB 3.0 bus, an electro magnetic interference (EMI) design for avoiding radio wave interference may be required, and high costs may be consumed due to the avoidance design. In addition, EMI avoidance may be impossible according to system structures.

According to an embodiment of the disclosure, a method capable of using a USB 2.0 bus is proposed for a device whose configuration is constrained to use a USB 3.0 bus to communicate with other devices, thereby enabling transmission of data sensitive to real-time characteristics. According to an embodiment of the disclosure, a device connection solution capable of improving the transmission bandwidth of a USB 2.0 bus may be proposed.

Figure 3:
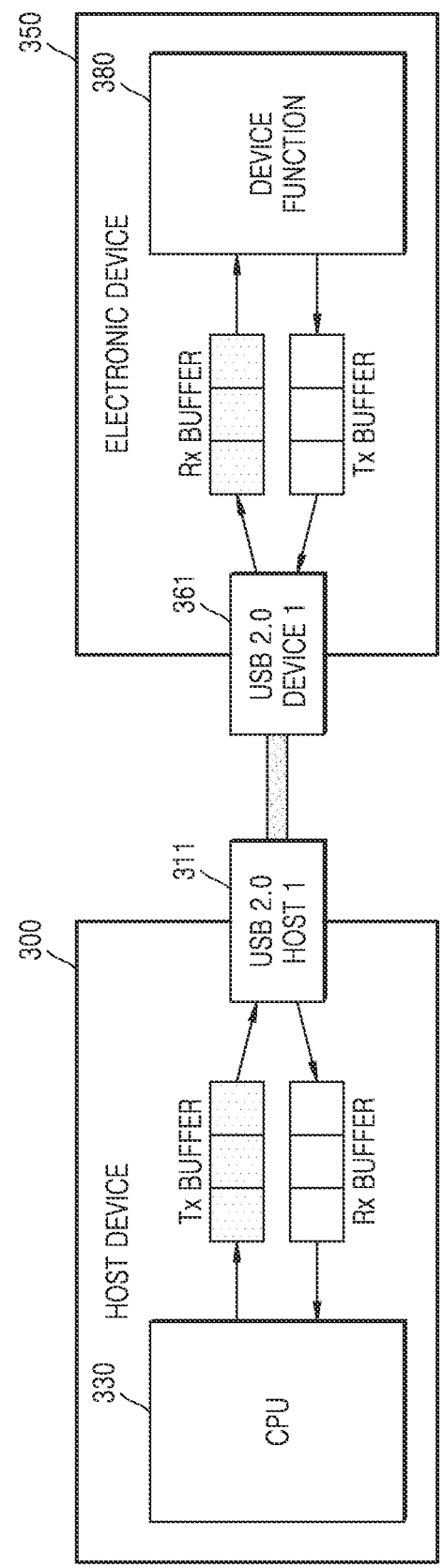
FIG. 3 illustrates physical configurations of a host device and an electronic device connected to each other through one USB bus.

FIG. 3 illustrates physical configurations of a host device and an electronic device connected to each other through one USB.

FIG. 3 shows an example in which a general host device 300 and an electronic device 350 transmit and receive data according to the USB 2.0 standard. The USB 2.0 standard is a half-duplex bus method in which data is transmittable or receivable in only one direction. In other words, when the host device 300 is connected to the electronic device 350, while the host device 300 is transmitting data, the host device 300 is not able to receive data from the electronic device 350, or may not respond to an event generated in the electronic device 350 in real time.

When the host device 300 transmits data to the electronic device 350, a central processing unit (CPU) 330 of the host device 300 may transmit data to a USB 2.0 device controller 1 311 via a transmit buffer and then via a USB 2.0 host controller 1 361. Data received from the host device 300 may be stored in a reception buffer of the electronic device 350 and transferred to a device function 380. For example, the device function 380 may, for example, refer to a logic sub-device that provides the ability to perform a predetermined function or a predetermined function. For example, the device function 380 may be replaced with and expressed using terms such as an application, a driver, client software, firmware, and a program that perform predetermined functions.

When the electronic device 350 transmits data to the host device 300, the CPU of the electronic device 350 may transmit data to the USB 2.0 device controller 1 361 via a transmit buffer and then via the USB 2.0 host controller 1 311. Data received from the electronic device 350 may be stored in a reception buffer of the host device 300 and transferred to the CPU 330.

According to the physical configuration shown in FIG. 3, a transmission delay may occur when the amount of real-time streaming data is large. For example, when the USB 2.0 host controller 1 311 of the host device 300 guarantees only transmission of 1 to 3 512-byte packets per micro frame, transmission delay may occur because multi-audio data such as 5.1 channels or 7.1 channels exceeds the number of packets that are transmittable per frame.

Figure 4:
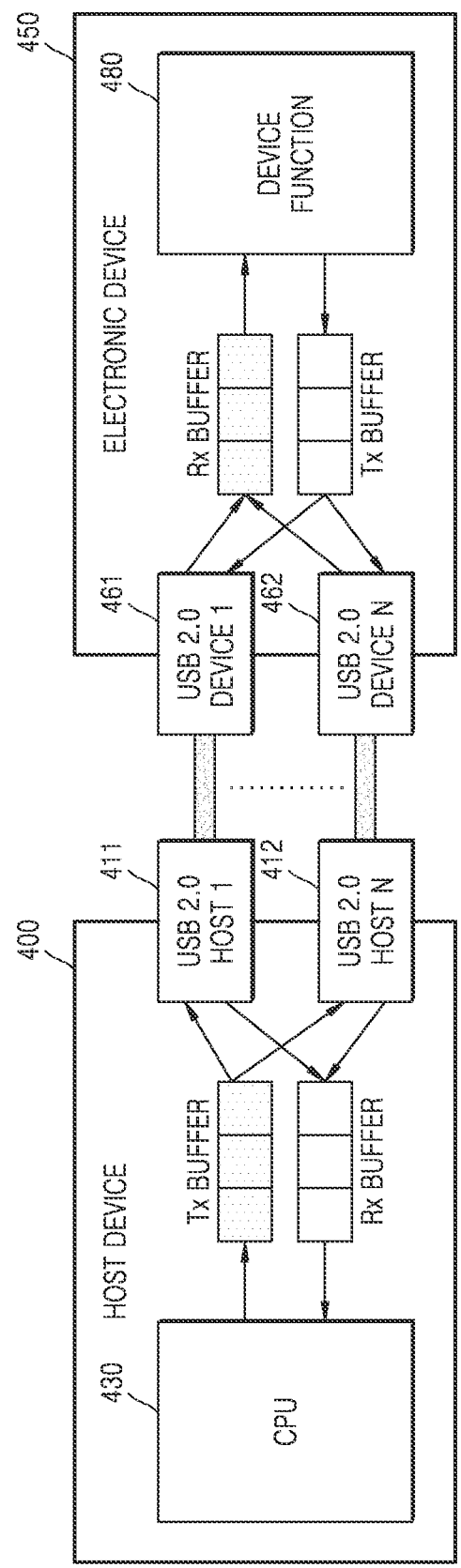
FIG. 4 illustrates physical configurations of a host device and an electronic device connected to each other through a plurality of USB buses according to various embodiments.

Therefore, according to an embodiment of the disclosure, in order to widen a data transmission bandwidth and improve real-time transmission characteristics, a connection method expanded from a 1:1 connection method of FIG. 3 to an N:N (where N is a natural number) connection method as shown in FIG. 4 is proposed.

FIG. 4 illustrates physical configurations of an example host device and an example electronic device connected to each other through a plurality of USB buses according to various embodiments.

A host device 400 according to an embodiment of the disclosure may include a plurality of USB host controllers to communicate with an electronic device 450 through a plurality of USB buses. For example, referring to FIG. 4, the host device 400 may include N USB host controllers 411 and 412 to communicate with the electronic device 450 through N USB buses. The electronic device 450 may include N USB device controllers 461 and 462 to communicate with the host device 400 through the N USB buses. The N USB host controllers 411 and 412 may be connected to the N USB device controllers 461 and 462, respectively, through N buses in a 1:1 correspondence. The host device 400 and the electronic device 450 can communicate with each other through N logical channels.

For N channels, each bus may be responsible for data transmission or reception. Alternatively, when expansion of a transmission bandwidth is necessary, the host device 400 may variably operate each bus as a transmission channel or as a reception channel.

A typical USB system has a structure in which one electronic device is connected to a USB host controller through one USB bus. Therefore, client software of a general host device (e.g., a USB driver for host devices) and a function of an electronic device (e.g., a driver for USB devices) are designed and implemented based on a 1:1 connection. Thus, as shown in FIG. 4, even when the host device 400 and the electronic device 450 are connected to each other through N USB buses, processing enables the host device 400 and the electronic device 450 to operate by recognizing that a CPU 430 of the host device 400 and a device function 480 of the electronic device 450 are connected to each other through a single USB bus in a 1:1 correspondence.

A gadget driver added according to an embodiment of the disclosure may guarantee compatibility with an existing higher-level driver designed based on 1:1 connection, by allowing the higher-level driver to recognize a physical multi-USB connection as a logical 1:1 USB connection. An example operation of a host device according to an embodiment of the disclosure will now be described in more detail with reference to a block diagram of the host device.

Figure 5A:
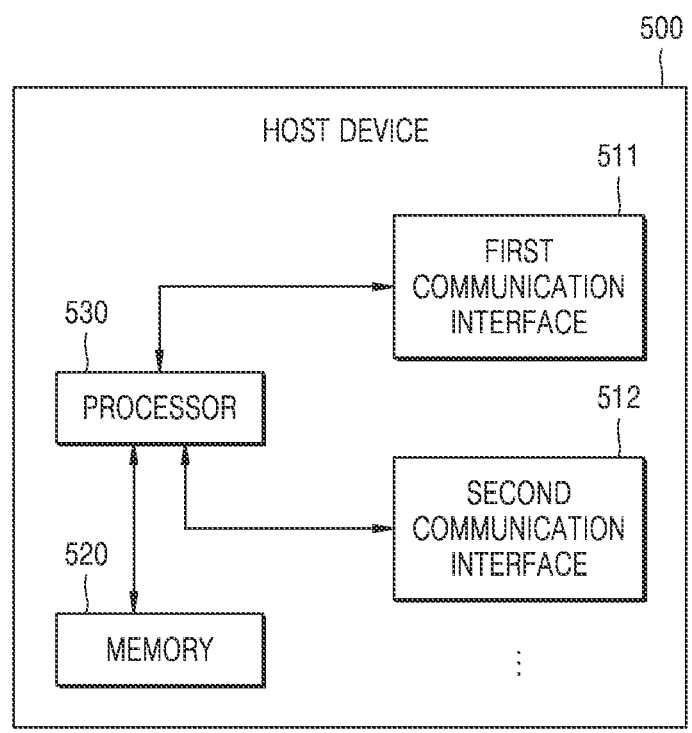
FIG. 5A is a block diagram of an example host device according to various embodiments.

FIG. 5A is a block diagram of an example host device according to various embodiments.

A host device 500 according to an embodiment may communicate with an electronic device through a plurality of USB buses.

The host device 500 according to an embodiment may be a device including a communication interface capable of communicating with an electronic device according to a USB protocol. For example, the host device 500 may be a stationary terminal implemented as a computer device or a mobile terminal. The host device may be at least one of, for example, a wearable device, a head mounted display (HMD), an earphone, a headset, a smartphone, a navigation device, a computer, a laptop computer, a digital broadcasting terminal, a speaker, personal digital assistants (PDAs), a portable multimedia player (PMP), or a tablet PC.

As shown in FIG. 5A, the host device 500 may include a plurality of communication interfaces 511 and 512, a memory 520, and a processor 530.

Each of the plurality of communication interfaces 511 and 512 according to an embodiment of the disclosure may include a USB interface for transmitting and receiving data according to a USB standard. Each of the plurality of communication interfaces 511 and 512 may include a USB host controller for communicating with another device through a USB bus, and may communicate with an electronic device according to the USB standard. The USB host controller may be a semiconductor chip for controlling communication according to the USB protocol. The USB host controller may be connected to a USB port, and may exchange data with an electronic device by being connected to the electronic device by a USB bus through the USB port.

For example, the plurality of communication interfaces 511 and 512 may support data communication according to a USB 2.0 standard. In FIG. 5A, a case in which the host device 500 includes two communication interfaces 511 and 512 is described as an example. However, the disclosure may include three or more communication interfaces and is not limited in this respect.

The memory 520 according to an embodiment of the disclosure may store data such as basic programs, application programs, configuration information or the like, for operations of the host device 500. The memory 520 may be implemented as a volatile memory, a non-volatile memory, or a combination of a volatile memory and a non-volatile memory. The memory 520 may provide stored data, in response to a request by the processor 530. However, the disclosure is not limited thereto, and a storage space or buffer for storing basic programs, application programs, configuration information, or input/output data may be provided in the processor 530.

The processor 530 according to an embodiment of the disclosure may control at least one component of the host device 500 to perform an intended operation by executing at least one instruction stored in the memory 520. Therefore, even in a case in which the processor 530 performs a predetermined operation is described as an example in the following description, the case in which the processor 530 performs the predetermined operation may refer, for example, to the processor 530 controlling at least one component included in the host device 500 so that the at least one component performs a predetermined operation.

The processor 530 according to an embodiment of the disclosure may obtain information about a plurality of physical endpoints, which is used for communication by each USB host controller, from the plurality of USB host controllers of the plurality of communication interfaces 511 and 512. The information about the plurality of physical endpoints of each USB host controller may include endpoint configuration information of each USB host controller. The processor 530 may identify the plurality of USB host controllers connected to the electronic device through the plurality of USB buses, and may obtain the end point configuration information of each USB host controller from the identified plurality of USB host controllers.

For example, the endpoint configuration information may include information about the number of at least one endpoint, a data transmission direction of the at least one endpoint, and a transmission type of the at least one endpoint, which is used by the USB host controller to exchange data with the electronic device. The processor 530 may receive an endpoint descriptor through each USB bus, and may obtain endpoint configuration information of a USB host controller connected to the USB bus from the received endpoint descriptor.

When the host device is connected to the electronic device, a plurality of communication pipes for communication between the host device and the electronic device may be configured. Each of the communication pipes may refer, for example, to a connection between an endpoint of the host device and an endpoint of the electronic device, and may be identified by the connected end points. An endpoint may refer to a data source or sink of a USB host controller or USB device controller connected to a USB bus. The USB host controller and the USB device controller may transmit data or receive data through one or more endpoints. The endpoints of the USB host controller and the endpoints of the USB device controller are mapped in a 1:1 correspondence. For example, a list of endpoints connected between the USB device controller of the electronic device and the USB host controller of the host device may include an endpoint zero (0) for device recognition and control and at least one endpoint for data transmission and reception.

The host device 500 may periodically check the state of the USB bus connected to the host device 500, and may perform an enumerating process when a new USB bus is connected to the USB host controller. The host device 500 may allocate addresses to communication pipes between the host device 500 and the electronic device during the enumerating process.

The processor 530 according to an embodiment of the disclosure may reconfigure endpoints used for communication by the plurality of USB host controllers, based on the endpoint configuration information. The processor 530 may reconfigure the endpoints used for communication by the plurality of USB host controllers, based on a required transmission bandwidth or the amount of transmission data.

The processor 530 according to an embodiment of the disclosure may configure a different number of logical endpoints from a plurality of physical endpoints of the plurality of USB host controllers, based on information about the plurality of physical endpoints, so that the plurality of USB host controllers may communicate with a predetermined application. Reconfiguring endpoints in the disclosure may, for example, refer to configuring logical endpoints based on the information about the physical endpoints of the plurality of USB host controllers. The processor 530 may perform communication with the electronic device through the plurality of physical endpoints of the plurality of USB host controllers by controlling the plurality of USB host controllers through the logical endpoints.

The processor 530 according to an embodiment of the disclosure, based on reconfiguration information of the endpoints, may combine data respectively received through the physical endpoints of the plurality of USB host controllers with each other and output a result of the combination to the logical endpoints. The reconfiguration information of end points may include mapping information between the physical endpoints and the logical endpoints of the plurality of USB host controllers. Alternatively, based on the reconfiguration information of the endpoints, the processor 530 may multiplex data received through the logical endpoints and output a result of the multiplexing to the plurality of USB host controllers through the physical endpoints.

For example, the processor 530 may map first physical endpoints having a predetermined transmission direction and a predetermined transmission type among the physical endpoints of the plurality of USB host controllers to a first logical endpoint. Based on mapping information between the first physical endpoints and the first logical endpoint, the processor 530 may combine data respectively received through the first physical endpoints with each other and may transmit a result of the combination to the predetermined application through the first logical endpoint. Alternatively, the processor 530 may multiplex data output through the first logical endpoint and may output a result of the multiplexing through the first physical endpoints, based on the mapping information between the first physical endpoints and the first logical endpoint.

The processor 530 according to an embodiment of the disclosure may configure a predetermined number of logical endpoints, based on information about the physical endpoints used for communication by the plurality of USB host controllers, so that the plurality of USB host controllers may communicate with one predetermined application (e.g., a main driver or client software) using the predetermined number of logical endpoints. For example, the processor 530 may reconfigure 12 endpoints of the plurality of USB host controllers into 6 logical end points suitable for the main driver.

The processor 530 may reconfigure the endpoints by mapping a logical endpoint with a new number to the physical endpoints that the plurality of USB host controllers use for communication. For example, the processor 530 may reconfigure the endpoints by mapping the same logical endpoint with a new number to physical endpoints having the same data transmission directions and the same transmission types among the physical endpoints used for communication by the plurality of USB host controllers.

The processor 530 may control the gadget driver to transfer data between the plurality of USB host controllers and the main driver, based on the reconfiguration information of the endpoints. The processor 530 may enable the main driver to recognize as if communicating with the electronic device through one USB bus, by using the gadget driver. For example, the gadget driver may multiplex data output by the main driver and transmit a result of the multiplexing to the plurality of USB host controllers, based on the reconfiguration information of the endpoints. Alternatively, the gadget driver may demultiplex data received from the electronic device through the plurality of USB host controllers, based on the reconfiguration information of the endpoints. The gadget driver may deliver the demultiplexed data to the main driver.

A first communication interface 511 among the plurality of communication interfaces may include a first USB host controller connected to a first USB bus among the plurality of USB buses. The first USB host controller may allocate different frame numbers to frames each having a predetermined time length for data received through the first USB bus, and may transfer frame packets to which the frame numbers are allocated to the processor 530.

A second communication interface 512 among the plurality of communication interfaces may include a second USB host controller connected to a second USB bus among the plurality of USB buses. The second USB host controller may allocate different frame numbers to frames each having a predetermined time length for data received through the second USB bus, and may transfer frame packets to which the frame numbers are allocated to the processor 530.

Based on the frame numbers allocated to the frame packets received through the plurality of communication interfaces and the reconstruction information of the endpoints, the processor 530 according to an embodiment of the disclosure may drive the gadget driver to arrange the frame packets and deliver them to the predetermined application. The processor 530 may drive the gadget driver to arrange the frame packets based on a difference between the frame numbers of start of frame (SoF) packets output by the plurality of host controllers.

In more detail, each USB host controller included in each of the plurality of communication interfaces 511 and 512 may assign a frame number to output data at predetermined time intervals. The processor 530 according to an embodiment of the disclosure may obtain a frame number difference between data respectively received from the plurality of USB host controllers. The processor 530 may obtain a frame number difference generated according to an initialization sequence of the USB host controllers, in an initialization stage between the USB host controllers and the USB buses. The processor 530 may correct the frame numbers assigned to the data respectively received from the plurality of USB host controllers, based on the frame number difference. The processor 530 may combine the data respectively received through the physical endpoints of the plurality of USB host controllers with each other and output a result of the combination to the logical endpoints, according to a sequence determined based on the corrected frame numbers.

The processor 530 according to an embodiment of the disclosure may receive data including a plurality of packets from an electronic device through each of the plurality of USB host controllers. The processor 530 may obtain frame numbers assigned to the data from SoF packets included in a plurality of packets at predetermined time intervals, and may obtain endpoint configuration information for endpoints transmitted by data packets included between the SoF packets, from the data packets. The processor 530 may reconfigure endpoints used for communication by the plurality of USB host controllers, based on the endpoint configuration information. The processor 530 may correct the frame numbers assigned to the data respectively received from the plurality of USB host controllers, based on the frame number difference. The processor 530 may combine the data respectively received through the physical endpoints of the plurality of USB host controllers with each other and output a result of the combination to the logical endpoints, based on the reconfiguration information of the endpoints, according to a sequence determined based on the corrected frame numbers.

Figure 5B:
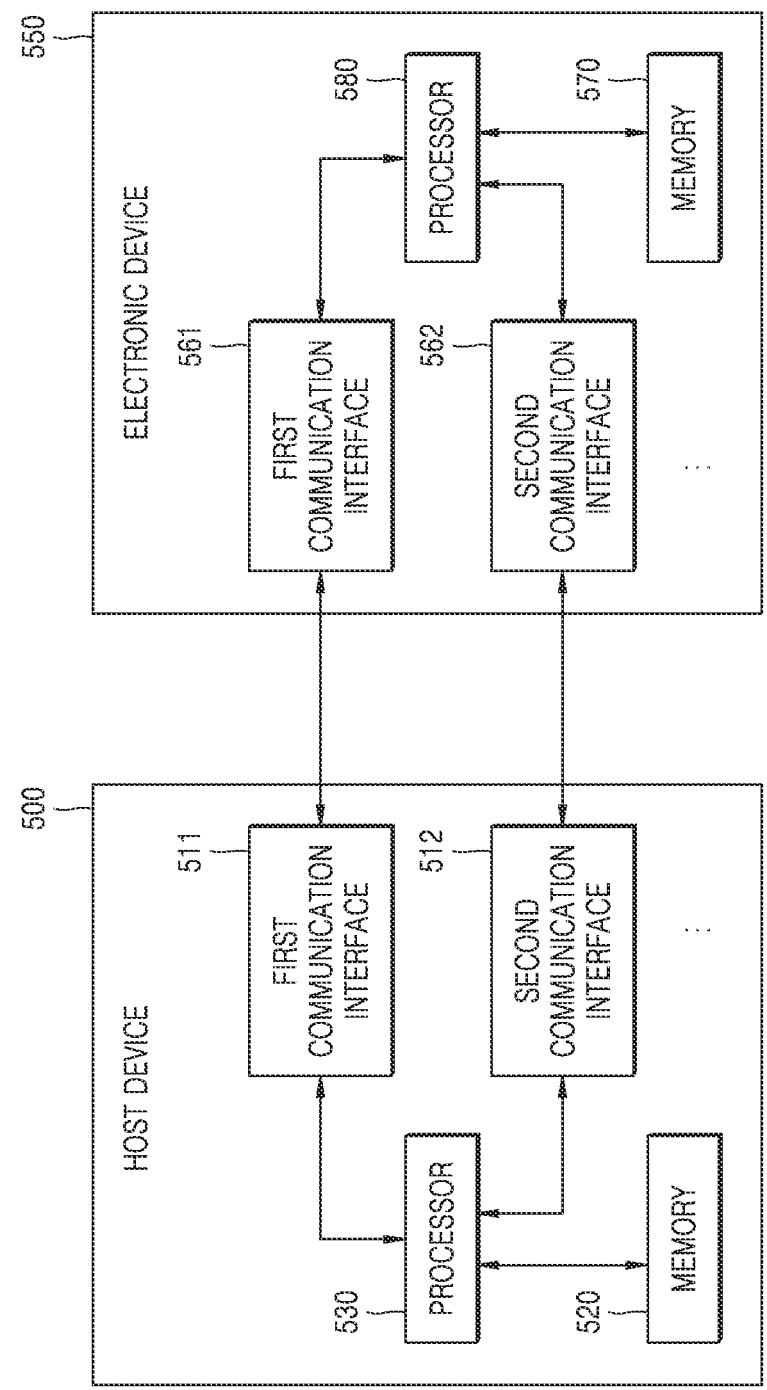
FIG. 5B is a block diagram of an example host device and an example electronic device according to various embodiments.

FIG. 5B is a block diagram of an example host device and an example electronic device according to various embodiments.

As shown in FIG. 5B, two devices (i.e., the host device 500 and an electronic device 550) may be connected to each other through the plurality of USB buses and communicate with each other. The host device 500 and the electronic device 550 may be devices having similar configurations and similar operation methods. In the disclosure, at least a portion of the configuration and the operation method of the host device 500 is applicable to the electronic device 550, and at least a portion of the configuration and the operation method of the electronic device 550 is also applicable to the host device 500. A repeated description thereof will be omitted.

A USB system according to an embodiment of the disclosure may be implemented as a tiered-star topology, and may include a host device having one or more USB ports and one or more electronic devices connected to the host device through the one or more USB ports. The host device 500 according to an embodiment of the disclosure may be connected to the electronic device 550 through the plurality of USB buses.

Although the host device 500 and the electronic device 550 are illustrated as including one processor in FIGS. 5A and 5B, an embodiment of the disclosure is not limited thereto. The host device 500 and the electronic device 550 may include a plurality of processors. At least some of the operations and functions of the processor 530 and processor 580 described in the disclosure may be performed by a plurality of processors.

Each of a plurality of communication interfaces 561 and 562 of the electronic device 550 according to an embodiment of the disclosure may include a USB interface for transmitting and receiving data according to a USB standard. Each of the plurality of communication interfaces 561 and 562 may include a USB device controller for communicating with another device through a USB bus, and may communicate with a host device according to the USB standard. For example, the plurality of communication interfaces 561 and 562 may support data communication according to a USB 2.0 standard. In FIG. 5B, a case in which the electronic device 550 includes two communication interfaces 561 and 562 is described as an example. However, the disclosure may include three or more communication interfaces and is not limited in this respect.

The memory 570 according to an embodiment of the disclosure may store data such as basic programs, application programs, configuration information or the like, for operations of the electronic device 550. The memory 570 may be implemented as a volatile memory, a non-volatile memory, or a combination of a volatile memory and a non-volatile memory. The memory 570 may provide stored data, in response to a request by the processor 580. However, the disclosure is not limited thereto, and a storage space for storing basic programs, application programs, or configuration information may be provided in the processor 580.

The processor 580 according to an embodiment of the disclosure may control at least one component of the electronic device 550 to perform an intended operation by executing at least one instruction stored in the memory 570. Therefore, even when a case in which the processor 580 performs a predetermined operation is described as an example in the following description, the case in which the processor 580 performs the predetermined operation may refer, for example, to the processor 580 controlling at least one component included in the electronic device 550 so that the at least one component performs a predetermined operation.

When a plurality of USB device controllers of the plurality of communication interfaces 561 and 562 are connected to the host device 500 through a plurality of USB buses, the processor 580 according to an embodiment of the disclosure may reconfigure the endpoints of a predetermined application based on the endpoint configuration information of each of the USB device controllers. For example, the endpoint configuration information may include information about the number of at least one endpoint, a data transmission direction of the at least one endpoint, and a transmission type of the at least one endpoint, which is used by the USB device controller to exchange data with the host device. The processor 580 may communicate with the host device 500 through the plurality of USB device controllers, based on the reconfiguration information of the endpoints.

For example, the processor 580 may multiplex data output by the predetermined application (e.g., a driver, software, or a device function) and may transmit the multiplexed data to the plurality of USB device controllers, based on the reconfiguration information of endpoints. Alternatively, the processor 580 may demultiplex data received from the host device 500 and output by the plurality of USB device controllers, based on the reconfiguration information of the endpoints. The processor 580 may deliver the demultiplexed data to the predetermined application.

In a process of demultiplexing data received through a plurality of USB device controllers, the processor 580 according to an embodiment of the disclosure may arrange data based on frame numbers allocated for data received through the plurality of USB buses. The processor 580 may deliver the arranged data to the predetermined application. The processor 580 may use frame numbers of SoF packets respectively generated by the plurality of USB device controllers as synchronization information, to synchronize data transmitted and received through the plurality of USB buses. For example, the processor 580 may rearrange data based on a difference between the frame numbers of the SoF packets output by the plurality of USB device controllers.

Figure 6:
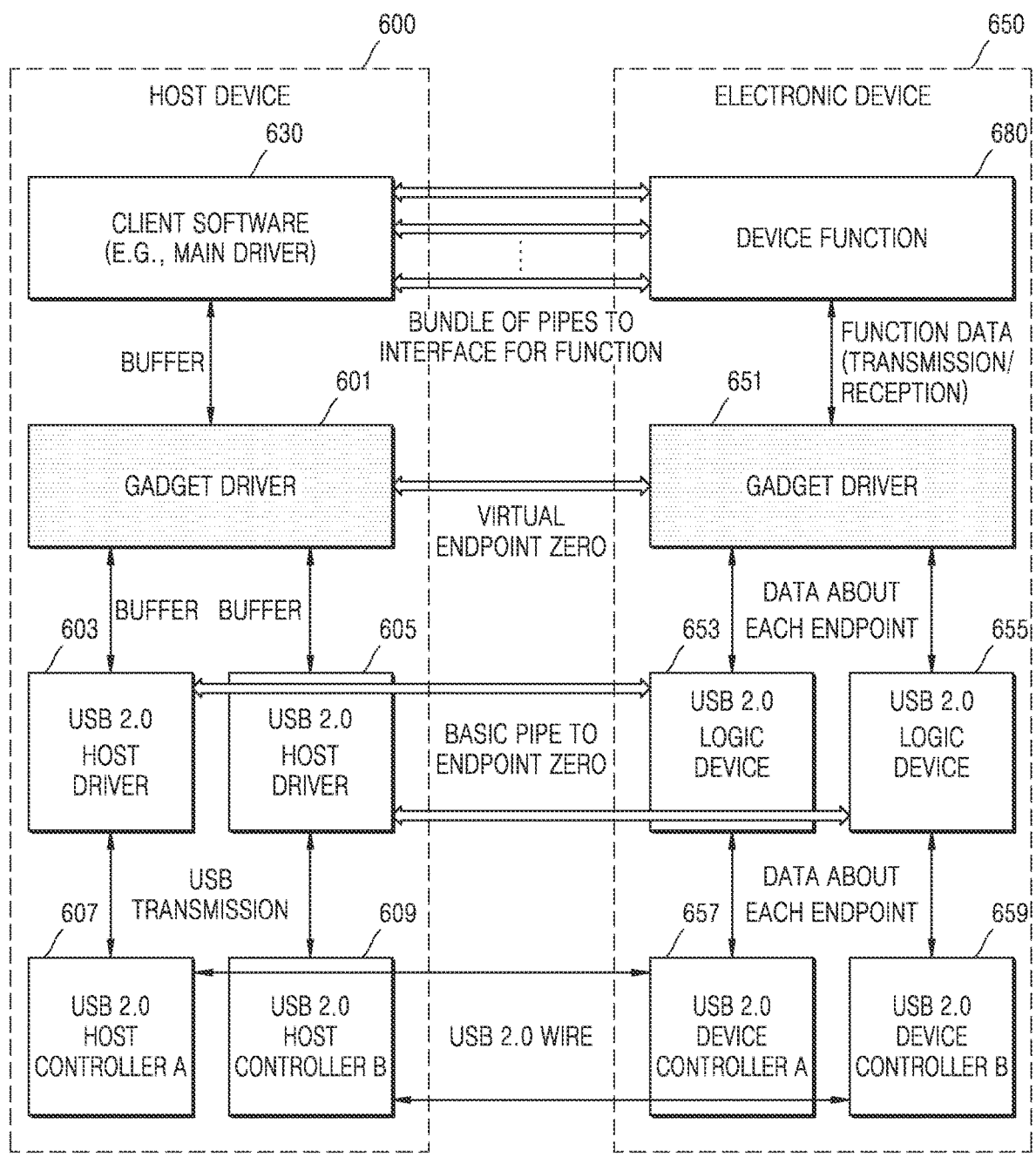
FIG. 6 is a block diagram of an example software structure of a host device and an electronic device according to various embodiments.

FIG. 6 is a block diagram of an example software structure of a host device and an electronic device according to various embodiments.

A host device 600 and an electronic device 650 according to an embodiment of the disclosure are physically connected to each other through a plurality of USB buses. However, as shown in FIG. 6, the host device 600 and the electronic device 650 may operate as if connected to each other through a single USB bus, due to a virtual gadget driver. In FIG. 6, a case in which the host device 600 and the electronic device 650 are connected to each other via two buses is described as an example for convenience of explanation. However, the host device 600 and the electronic device 650 may be connected to each other via three or more buses and the disclosure is not limited in this respect.

The host device 600 may include a USB 2.0 host controller A 607 and a USB 2.0 host controller B 609 for communicating with the electronic device 650. In correspondence with this, the electronic device 650 may include a USB 2.0 device controller A 657 and a USB 2.0 device controller B 659 for communicating with the host device 600.

The USB 2.0 host controller A 607 and the USB 2.0 host Controller B 609 may be connected to the USB 2.0 device controller A 657 and the USB 2.0 device controller B 659, respectively, via a USB 2.0 bus, and may control data transmission/reception of the USB 2.0 device controller A 657 and the USB 2.0 device controller B 659.

The electronic device 650 may transmit/receive data through a plurality of USB buses in order to support a predetermined function to the host device 600. For example, when the electronic device 650 is a device supporting a Wi-Fi 6 function, the electronic device 650 may be connected to the host device 600 and support the host device 600 to access the Internet. A device function 680 of the electronic device 650 may refer, for example, to a logic sub-device that provides the ability to perform a predetermined function or a predetermined function. For example, the device function 680 may be replaced with and expressed using terms such as an application, a driver, client software, firmware, and a program that perform predetermined functions.

The electronic device 650 may transmit/receive data within the device through pipes (i.e., logical channels). The endpoints of the USB device controllers 657 and 659 and the endpoint of the device function 680 may be connected to each other by a pipe. At this time, a gadget driver 651 of the electronic device 650 according to an embodiment of the disclosure may reconfigure endpoints of the device function 680, based on endpoint configuration information used for communication by the plurality of USB device controllers 657 and 659.

The gadget driver 651 may perform communication between the USB 2.0 device controller A 657, the USB 2.0 device controller B 659, and the device function 680, based on endpoint reconfiguration information. The gadget driver 651 may transmit data received from the USB 2.0 device controller A 657 and the USB 2.0 device controller B 659 to the device function 680, based on the endpoint reconfiguration information. Alternatively, the gadget driver 651 may transmit data received from the device function 680 to the USB 2.0 device controller A 657 and the USB 2.0 device controller B 659, based on the endpoint reconfiguration information.

The gadget driver 651 may transmit or receive data for each endpoint to or from the USB 2.0 device controller A 657 and the USB 2.0 device controller B 659 through a USB 2.0 logic device 653 and a USB 2.0 logic device 655, respectively.

The host device 600 is connected to the electronic device 650 via the USB 2.0 host controller A 607 and the USB 2.0 host controller B 609. For example, the USB 2.0 host controller A 607 and the USB 2.0 device controller A 657 may be connected through a USB 2.0 bus (or wire), and the USB 2.0 host controller B 609 and the USB 2.0 device controller B 659 may be connected via another USB 2.0 bus (or wire).

Client software 630 of the host device 600 may, for example, be a predetermined application that uses functions supported by the electronic device 650 by communicating with the electronic device 650. For example, the client software 630 of the host device 600 may be a main driver configured to control communication according to the USB protocol.

As shown in FIG. 6, as the host device 600 is connected to the electronic device 650 through a plurality of USB buses, a gadget driver 601 may obtain endpoint configuration information of each USB host controller from the plurality of USB host controllers 607 and 609.

When a USB 2.0 host driver 603 and a USB 2.0 host driver 605 of the host device 600 detect that the electronic device 650 is connected through a plurality of USB buses, the USB 2.0 host driver 603 and the USB 2.0 host driver 605 may transmit a control packet to the electronic device 550 through a basic pipe that connects the endpoint zero (0), and may receive endpoint configuration information. The endpoint zero may, for example, indicate an endpoint used for device recognition and control among a plurality of endpoints. The gadget driver 601 may obtain endpoint configuration information of the plurality of USB host controllers 607 and 609 through the USB 2.0 host driver 603 and the USB 2.0 host driver 605, respectively.

The gadget driver 601 may reconfigure endpoints used for communication by the plurality of USB host controllers 607 and 609, based on the endpoint configuration information. The gadget driver 601 may reconfigure the endpoints used for communication by the plurality of USB host controllers 607 and 609 into a predetermined number of logical endpoints so that the plurality of USB host controllers 607 and 609 may communicate with the client software 630 using the predetermined number of logical endpoints. Reconfiguring endpoints may refer, for example, to creating one or more logical endpoints based on one or more physical endpoints. For example, a gadget driver may group a plurality of physical endpoints to create a single logical endpoint. Creating a logical endpoint may refer, for example, to integrating input/output data through at least one physical endpoint and using a result of the integration as input/output data of the logical endpoint. The gadget driver 601 may perform communication between the USB 2.0 device controller A 607, the USB 2.0 device controller B 609, and the device function 630, based on the endpoint reconfiguration information. The gadget driver 601 may combine the data respectively received from the USB 2.0 device controller A 607 and the USB 2.0 device controller B 609 with each other and may transmit a result of the combination to the client software 630, based on the endpoint reconfiguration information. Alternatively, the gadget driver 601 may multiplex the data received from the device function 630 and transmit a result of the multiplexing to the USB 2.0 device controller A 607 and the USB 2.0 device controller B 609, based on the endpoint reconfiguration information. As shown in FIG. 6, the gadget driver 601 according to an embodiment of the disclosure may reconfigure the endpoints of the plurality of USB 2.0 host controllers 607 and 609 to be suitable for the client software 630, so that the client software 630 may operate as if communicating with the electronic device 650 through one USB bus.

Figure 7A:
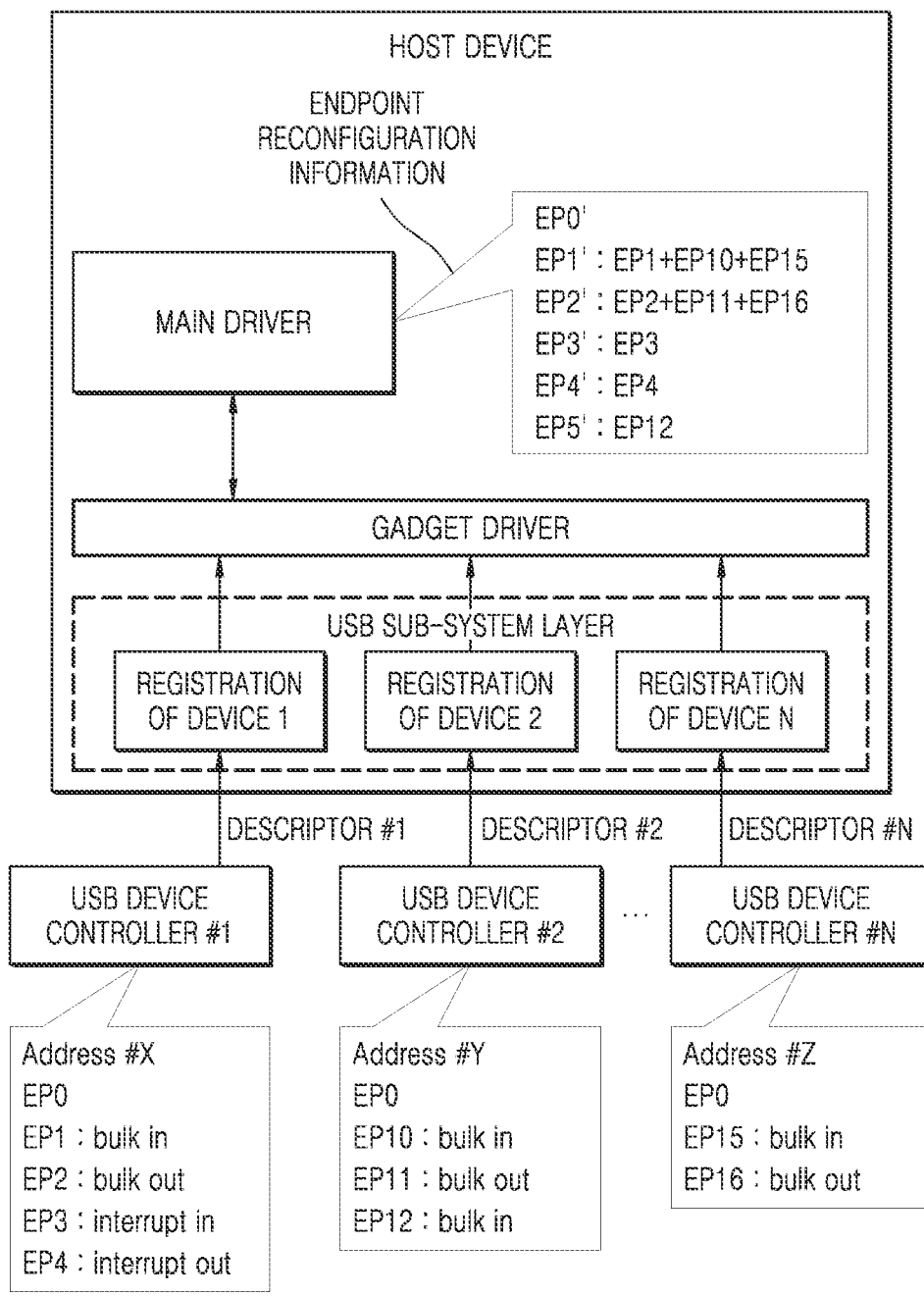
FIG. 7A is a block diagram for explaining an example reconfiguration process of the endpoints of a host device according to various embodiments.

FIG. 7A is a block diagram for explaining an example reconfiguration process of the endpoints of a host device according to various embodiments.

As described above, a host device that is connected to an electronic device through a plurality of USB buses may reconfigure pipes (or logical channels or connections between endpoints) for communication in transmitting and receiving data within the host device. The pipes for communication may include a message pipe corresponding to an end point 0 (EP0) for recognition and control of a device, and stream pipes corresponding to a list of endpoints for data transmission and reception.

FIG. 7A illustrates a case in which the host device is connected to the electronic device through N USB buses. As shown in FIG. 7A, USB device controllers of the electronic device connected to a plurality of USB host controllers of the host device may have respective endpoint configurations for communication.

For example, a USB device controller #1 may have an endpoint configuration including EP0 as an endpoint for device recognition and control, EP1 as a bulk in endpoint for data input, EP2 as a bulk out endpoint for data output, EP3 as an interrupt in endpoint for inputting an interrupt signal, and EP4 as an interrupt out endpoint for outputting an interrupt signal. A USB device controller #2 may have an endpoint configuration including EP0 as an endpoint for device recognition and control, EP10 as a bulk in endpoint, EP11 as a bulk out endpoint, and EP12 as a bulk in endpoint. A USB device controller #N may have an endpoint configuration including EP0 as an endpoint for device recognition and control, EP15 as a bulk in endpoint, and EP16 as a bulk out endpoint.

When the USB device controller #1, the USB device controller #2, and the USB device controller #N of the electronic device are connected through N USB buses, the host device may transmit a control packet to each USB device controller through a basic pipe connecting the endpoint zero (0), and may receive a descriptor including endpoint configuration information from each USB device controller. Registration of each USB bus may be performed in a USB subsystem layer of the host device based on the received endpoint configuration information.

For example, when three USB device controllers of the electronic device are connected through three USB buses, the host device may receive a descriptor including endpoint configuration information from each of the three USB device controllers through the basic pipe connecting the endpoint zero (0), and may reconstruct endpoints based on the descriptor.

For example, when N USB device controllers of the electronic device are connected through N USB buses, the host device may receive a descriptor including endpoint configuration information from each of the N USB device controllers through the basic pipe connecting the endpoint zero (0), and may reconstruct endpoints based on the descriptor. As such, the host device may automatically recognize the number of USB device controllers of the connected electronic device, and may dynamically reconfigure an endpoint based on the recognized number of USB device controllers. As shown in FIG. 7A, a main driver of the host device may use all of six endpoints including EP0', EP1', EP2', EP3', EP4', and EP5' when data is input and output. Thus, 12 endpoints of a plurality of USB device controllers need to be reconfigured for communication with the main driver. As shown in FIG. 7A, a gadget driver according to an embodiment of the disclosure may reconfigure physical endpoints EP0, EP1, EP2, EP3, EP4, EP10, EP11, EP12, EP15, and EP16 of the USB device controllers connected to the host device into logical endpoints EP0' through EP5' of the main driver.

For example, the gadget driver of the host device may reconfigure the endpoints by mapping physical endpoints having the same data transmission directions and the same transmission types among the physical endpoints of the plurality of USB host controllers to one logical endpoint.

For example, the gadget driver may group the EP0s of the USB device controllers and map the grouped EP0s to the main driver's endpoint EP0', and may group the bulk in endpoints EP1, EP10, and EP15 of the USB device controllers and map the grouped bulk in endpoints EP1, EP10, and EP15 to the main driver's endpoint EP1'. The gadget driver may bundle the bulk out endpoints EP2, EP11, and EP16 of the USB device controllers and map them to the main driver's endpoint EP2', and may create mapping of the interrupt in endpoint EP3 of the USB device controller #1 to the main driver's endpoint EP3'. The gadget driver may map the interrupt out endpoint EP4 of the USB device controller #1 to the main driver's endpoint EP4', and may map the bulk in endpoint EP12 of the USB device controller #2 to the main driver's endpoint EP5'.

As such, the gadget driver according to an embodiment of the disclosure may reconfigure the physical endpoints so that one or more physical endpoints are mapped to each logical endpoint, and may enable simultaneous data transmission and reception through the one or more physical endpoints mapped to each logical endpoint. Therefore, a data transmission bandwidth between the host device and the electronic device may increase even without changing the software of a main driver designed based on a 1:1 USB connection.

Figure 7B:
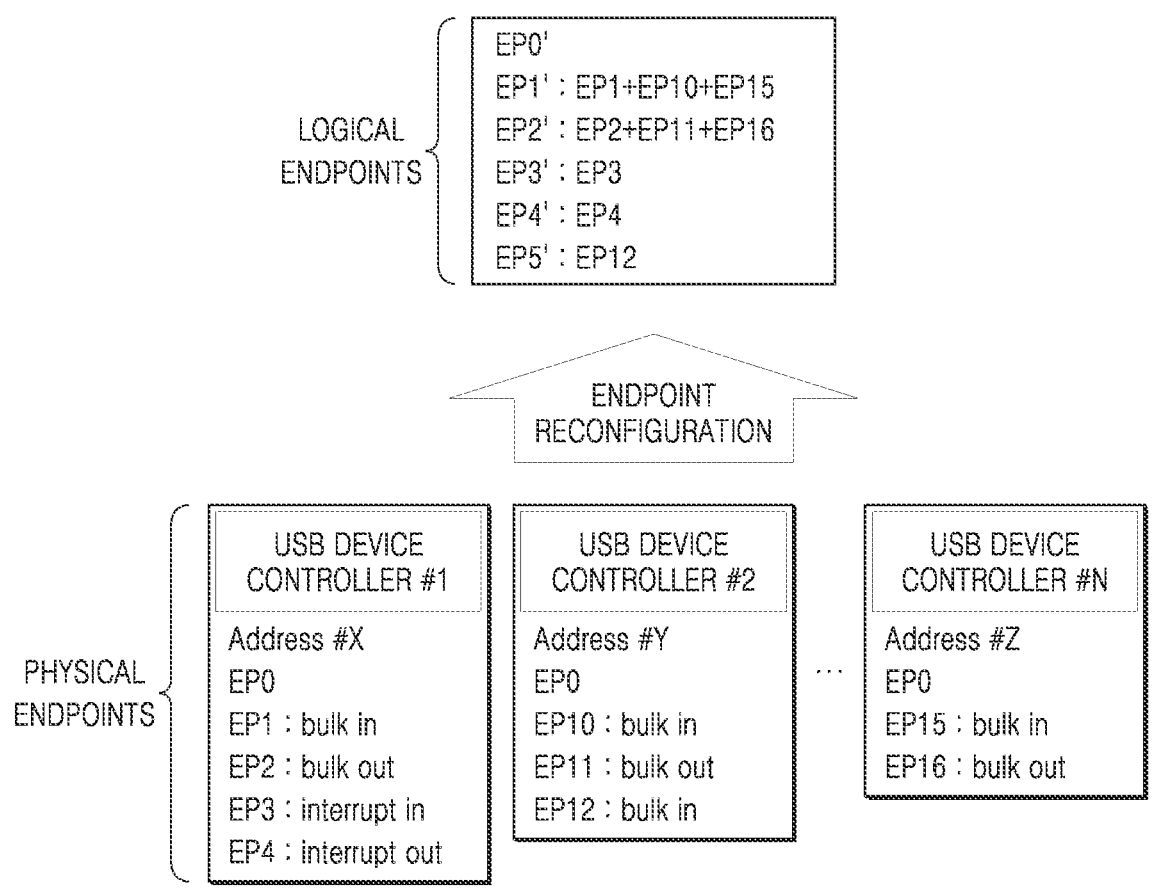
FIG. 7B is a block diagram for explaining an example reconfiguration process of the endpoints of a host device according to various embodiments.

FIG. 7B is a block diagram for explaining an example reconfiguration process of the endpoints of a host device according to various embodiments.

As shown in FIG. 7B, the gadget driver may map the EP0 of the USB device controllers to the endpoint EP0' of the main driver, and may map the bulk in endpoints EP1, EP10, and EP15 of the USB device controllers to the endpoint EP1' of the main driver. The gadget driver may map the bulk out endpoints EP2, EP11, and EP16 of the USB device controllers to the endpoint EP2' of the main driver, and may map the interrupt in endpoint EP3 of the USB device controller #1 to the endpoint EP3' of the main driver. The gadget driver may map the interrupt out endpoint EP4 of the USB device controller #1 to the endpoint EP4' of the main driver, and may map the bulk in endpoint EP12 of the USB device controller #2 to the endpoint EP5' of the main driver.

The gadget driver may transmit/receive data between the plurality of USB host controllers and the main driver, based on the reconfiguration information of the endpoints including this mapping information. For example, the gadget driver may combine data respectively output by the bulk in endpoints EP1, EP10, and EP15 of the USB device controllers with one another, transfer the combined data to the endpoint EP1' of the main driver, multiplex data output by the endpoint EP2' of the main driver, and transmit the multiplexed data to the bulk out endpoints EP2, EP11, and EP16 of the USB device controllers.

Accordingly, the main driver of the host device according to an embodiment of the disclosure may operate by recognizing the connection of multiple USB buses as a single USB bus connection, by communicating through the gadget driver.

Figure 8:
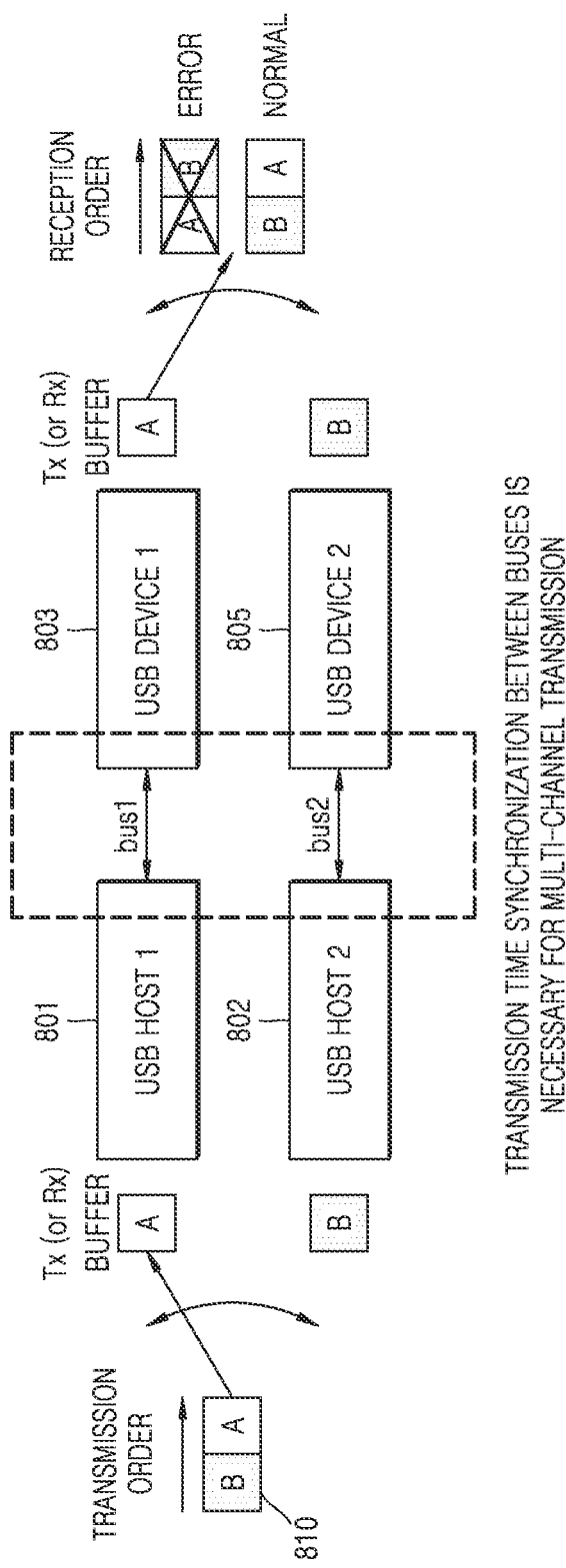
FIG. 8 is a view for explaining why data synchronization is necessary when an electronic device receives data through a plurality of USB buses according to various embodiments.

FIG. 8 is a view for explaining why synchronization is necessary when an electronic device receives data through a plurality of buses according to various embodiments.

As described above, when data is transmitted/received through a plurality of USB buses according to an embodiment of the disclosure, synchronization of data may be necessary in a process of multiplexing/demultiplexing data based on reconfiguration information of end points. For data synchronization, a method of adding synchronization information to a header of a transmitted packet may be used. However, in order to use a method of adding header information of a transmission packet, the entire existing driver needs to be redesigned, and a CPU operation is additionally needed to process the header information, resulting in transmission delay or loss of a transmission bandwidth.

FIG. 8 shows a case in which, during data transmission from a host device to an electronic device according to an embodiment of the disclosure, transmission data 810 is transferred from a first USB host controller 801 and a second USB host controller 802 to the electronic device via a USB bus 1 and a USB bus 2. The transmission data 810 may be multiplexed so that an A packet of the transmission data 810 may be delivered to the first USB host controller 801 and a B packet of the transmission data 810 may be delivered to the second USB host controller 802. The A packet of the transmission data 810 may be transferred from the first USB host controller 801 of the host device to a first USB device controller 803 of the electronic device through the USB bus 1. The B packet of the transmission data 810 may be transferred from the second USB host controller 802 of the host device to a second USB device controller 805 of the electronic device through the USB bus 2.

At this time, the A packet transmitted to the first USB device controller 803 and the B packet transmitted to the second USB device controller 805 need to be synchronized and rearranged based on a difference in frame transmission time between the two USB buses so as to be reconstructed in the same way as the transmission data 810.

According to an embodiment of the disclosure, a frame number, which is unique information of a packet transmitted through a USB protocol, may be used to synchronize the data respectively received through the plurality of buses. The frame number may be created by a USB host controller. For example, in the case of USB 2.0, a unique number may be assigned to each frame of 125 μsec. In this case, the frame number is information applied to data received through each USB bus, and is not shared between the USB buses.

Accordingly, the host device according to an embodiment of the disclosure may store a difference between frame numbers created according to an initialization sequence of connected USB buses and may use the difference for data synchronization. The host device may store the difference between the frame numbers of the USB buses, and may transmit the difference between the frame numbers to the electronic device connected to the host device.

For example, the host device and the electronic device may correct a frame number included in an SoF packet of the received data, based on the difference between the frame numbers. The host device and the electronic device may arrange and receive data in order based on the corrected frame number.

Figure 9:
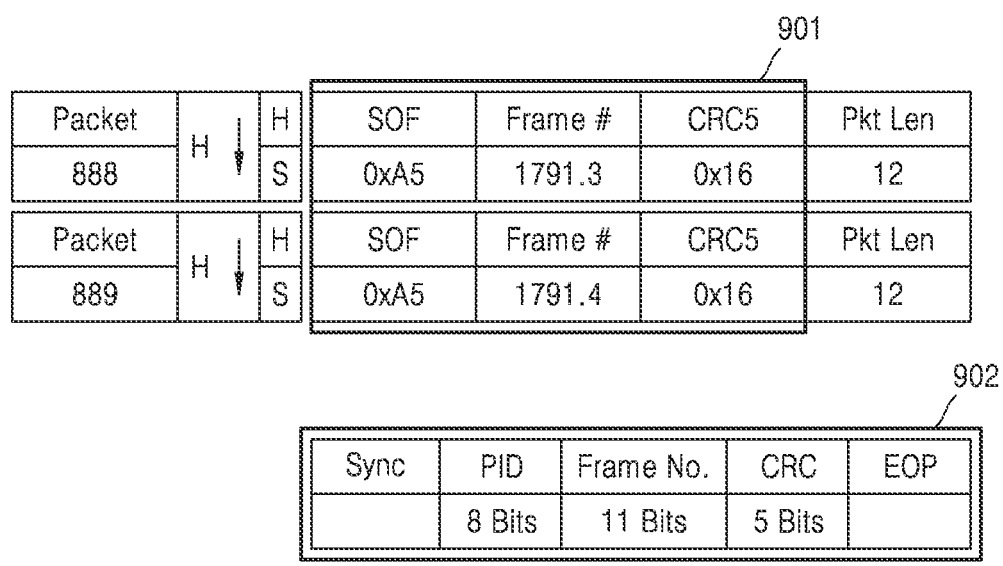
FIG. 9 is a diagram of an example structure of SoF packets according to various embodiments.

FIG. 9 is a diagram of an example structure of SOF packets according to various embodiments.

An SoF packet may indicate the start of a frame. The SoF packet may be transmitted at predetermined time intervals. For example, the SoF packet may be transmitted at intervals of 500 ns or 125 μsec. Referring to SoF packets 901, each SoF packet may include an incrementing frame number. Referring to an SoF packet format 902 of FIG. 9, the SoF packet may include a packet identifier (PID) field indicating packet identification information, a frame No. field indicating a frame number, and a cyclical redundancy check (CRC) field.

Figure 10:
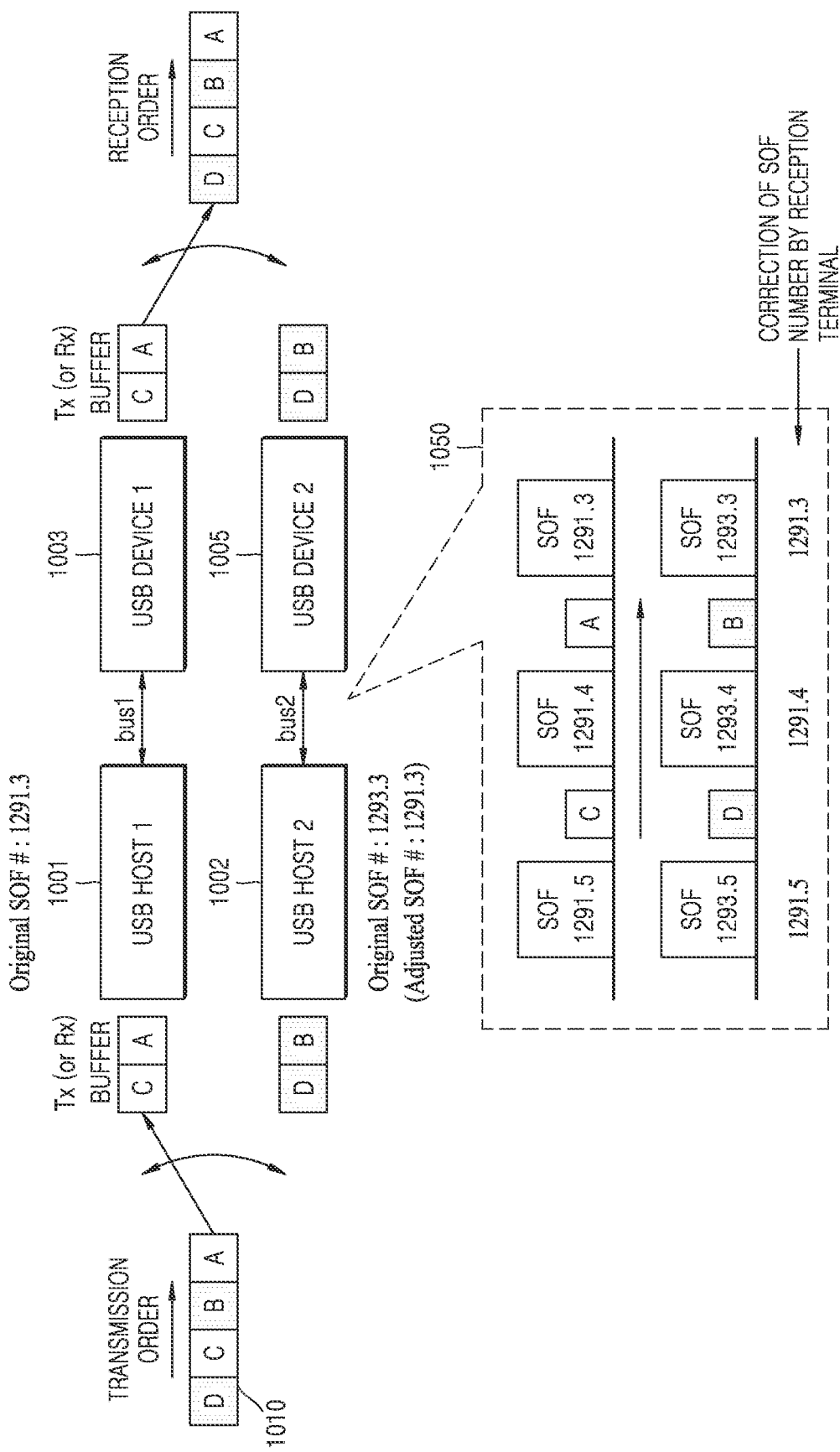
FIG. 10 is a view for explaining an example process of arranging frame packets by using SoF numbers when an electronic device receives data through a plurality of USB buses, according to various embodiments.

FIG. 10 is a view for explaining an example process of rearranging data when an electronic device receives data through a plurality of buses according to various embodiments.

FIG. 10 shows a case in which, during data transmission from a host device to an electronic device, transmission data 1010 is transferred from a first USB host controller 1001 and a second USB host controller 1002 to the electronic device via a USB bus 1 and a USB bus 2. The host device may multiplex the transmission data 1010 and transmit a result of the multiplexing to a plurality of USB host controllers, namely, the first and second USB host controllers 1001 and 1002, based on endpoint reconfiguration information. An A packet and a C packet of the transmission data 1010 may be delivered to the first USB host controller 1001, and a B packet and a D packet of the transmission data 1010 may be delivered to the second USB host controller 1002.

The A packet and the C packet of the transmission data 1010 may be transferred from the first USB host controller 1001 of the host device to a first USB device controller 1003 of the electronic device through the USB bus 1. The B packet and the D packet of the transmission data 1010 may be transferred from the second USB host controller 1002 of the host device to a second USB device controller 1005 of the electronic device through the USB bus 2.

In this case, the frame number of an SoF packet transmitted prior to the A packet through the USB bus 1 may be 1291.3, and the frame number of an SoF packet transmitted prior to the B packet through the USB bus 2 may be 1293.3. The electronic device receiving the transmission data 1010 may correct the frame number of an SoF packet assigned to the USB bus 2, based on a difference between the frame numbers of the SoF packets.

As shown in a time flow diagram 1050 of FIG. 10, the electronic device may correct an SoF frame number for the USB bus 2, based on a difference between the frame number of an SoF packet included in data received through the USB bus 1 and the frame number of an SoF packet included in data received through the USB bus 2. For example, the electronic device may correct a frame number 1293.3 of an SoF packet delivered prior to the B packet to 1291.3 and correct a frame number 1293.4 of an SoF packet delivered prior to the D packet to 1291.4, based on the difference between the SoF frame numbers. The electronic device may arrange the A packet and the C packet transmitted through the USB bus 1 and the first USB device controller 1003 and the B packets and D packets transmitted through the USB bus 2 and the second USB device controller 1005, according to an order determined based on the corrected SoF frame number.

As described above, according to various embodiments of the disclosure, a device designed based on an existing USB 2.0 bus may be used to support a wide transmission bandwidth like USB 3.0 even when the device is not redesigned based on USB 3.0. According to various embodiments of the disclosure, a data transmission speed and a transmission delay time may be improved, compared to an existing system using a single USB 2.0 bus.

When a device is designed based on USB 3.0, design restrictions due to noise and EMI may occur. However, according to various embodiments of the disclosure, a device is designed to perform communication between devices using a plurality of USB 2.0 buses, and thus is not limited in design.

In addition, a USB 3.0 host controller may increase the size of an Intellectual Property (IP) and the price of a System on Chip (SoC) in system design. For example, a low-price chipset may support only a USB 2.0 host controller and may not support a USB 3.0 host controller. Therefore, according to various embodiments of the disclosure, even a device that does not support USB 3.0 may be connected to other devices by using a wide transmission bandwidth like USB 3.0.

Moreover, various embodiments of the disclosure are equally applicable to a connection between devices using a plurality of USB 3.0 buses, and may dramatically increase a data transmission bandwidth through USB 3.0 buses.

An example operation method of a host device communicating with an electronic device according to various embodiments of the disclosure will now be described with reference to FIG. 11.

Figure 11:
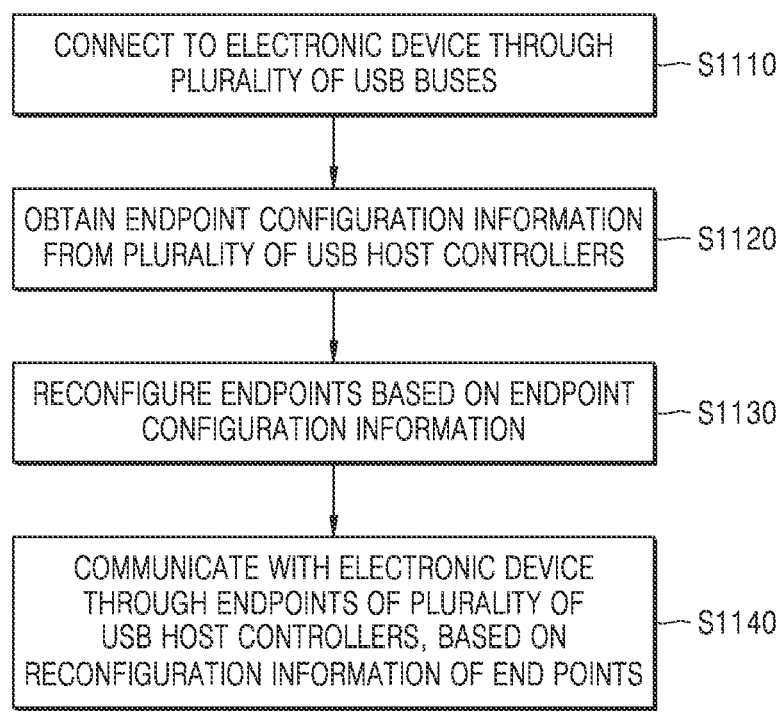
FIG. 11 is a flowchart of an example operation method of a host device according to various embodiments.

FIG. 11 is a flowchart of an example operation method of a host device according to an embodiment of the disclosure.

The operation method of the host device illustrated in FIG. 11 may be performed by host devices according to various embodiments of the disclosure, and descriptions of FIGS. 4 through 10 may be applied. Thus, a repeated description thereof will be omitted.

The host device according to an embodiment of the disclosure may communicate with an electronic device through a plurality of USB buses according to a USB protocol. According to an embodiment of the disclosure, in order to connect one host device to one electronic device, a plurality of USB buses may be connected in parallel and used.

In operation S1110, the host device according to an embodiment of the disclosure may be connected to the electronic device through a plurality of USB buses.

In operation S1120, the host device according to an embodiment of the disclosure may obtain endpoint configuration information from each of a plurality of USB host controllers connected to the plurality of USB buses. The host device may identify the plurality of USB host controllers connected to the electronic device through the plurality of USB buses, and may obtain end point configuration information from each of the identified plurality of USB host controllers.

For example, the endpoint configuration information may include information about at least one endpoint, which is used by the USB host controller to exchange data with the electronic device. For example, the endpoint configuration information may include information about the number of the at least one endpoint, a data transmission direction of the at least one endpoint, and a transmission type of the at least one endpoint.

In operation S1130, the host device according to an embodiment of the disclosure may reconfigure endpoints used for communication by the plurality of USB host controllers, based on the endpoint configuration information.

The host device according to an embodiment of the disclosure reconfiguring the endpoints may refer, for example, to configuring logical endpoints based on information about the physical endpoints of the plurality of USB host controllers. The host device according to an embodiment of the disclosure may configure a different number of logical endpoints from a plurality of physical endpoints of the plurality of USB host controllers, based on the information about the plurality of physical endpoints, so that the plurality of USB host controllers may communicate with a predetermined application.

The host device may reconfigure the endpoints used for communication by the plurality of USB host controllers, based on a required transmission bandwidth or the amount of transmission data.

The host device according to an embodiment of the disclosure may reconfigure physical endpoints used for communication by the plurality of USB host controllers into a predetermined number of physical endpoints so that a predetermined application using a predetermined number of logical endpoints may communicate with the plurality of USB host controllers. For example, the predetermined application may include a main driver configured to control communication according to the USB protocol, or client software.

The host device according to an embodiment of the disclosure may reconfigure the endpoints by mapping a logical endpoint with a new number to the physical endpoints that the plurality of USB host controllers use for communication. For example, the host device may reconfigure the endpoints by mapping the same logical endpoint with a new number to physical endpoints having the same data transmission directions and the same transmission types among the physical endpoints used for communication by the plurality of USB host controllers.

In operation S1140, the host device according to an embodiment may communicate with the electronic device through the endpoints of the plurality of USB host controllers, based on the reconfiguration information of the end points. The reconfiguration information of the end points may include mapping information between the physical endpoints and the logical endpoints of the plurality of USB host controllers. The host device may perform communication with the electronic device through the plurality of physical endpoints of the plurality of USB host controllers by controlling the plurality of USB host controllers through the logical endpoints configured based on information about the plurality of physical endpoints.

The host device according to an embodiment of the disclosure may combine data respectively received through the physical endpoints of the plurality of USB host controllers with each other and output a result of the combination to the logical endpoints, based on reconfiguration information of the endpoints. Alternatively, the host device may multiplex data received through the logical endpoints and output a result of the multiplexing to the plurality of USB host controllers through the physical endpoints, based on the reconfiguration information of the endpoints.

For example, the host device may map first physical endpoints having a predetermined transmission direction and a predetermined transmission type among the physical endpoints of the plurality of USB host controllers to a first logical endpoint. The host device may combine data respectively received through the first physical endpoints with each other and may transmit a result of the combination to the predetermined application through the first logical endpoint, based on mapping information between the first physical endpoints and the first logical endpoint. Alternatively, the host device may multiplex data output through the first logical endpoint and may output a result of the multiplexing through the first physical endpoints, based on the mapping information between the first physical endpoints and the first logical endpoint.

The host device according to an example embodiment of the disclosure may control a gadget driver to multiplex/demultiplex and transfer data between the plurality of USB host controllers and a main driver, based on the reconfiguration information of the endpoints. The host device may enable the main driver to recognize as if it was communicating with the electronic device through one USB bus, using the gadget driver. However, the host device according to an embodiment of the disclosure may drive the gadget driver to arrange frame packets received through the plurality of communication interfaces and deliver the arranged frame packets to the predetermined application, based on the frame numbers allocated to the frame packets and the reconstruction information of the endpoints. The host device may drive the gadget driver to arrange the frame packets based on a difference between the frame numbers of SoF packets output by the plurality of host controllers.

In more detail, each of the plurality of USB host controllers may assign a frame number to output data at predetermined time intervals. The host device according to an embodiment of the disclosure may obtain a frame number difference between data respectively received from the plurality of USB host controllers. The host device may obtain a frame number difference generated according to an initialization sequence of the USB host controllers, in an initialization stage between the USB host controllers and the USB buses. The host device may correct the frame numbers assigned to the data respectively received from the plurality of USB host controllers, based on the frame number difference. The host device may combine the data respectively received through the physical endpoints of the plurality of USB host controllers with each other and output a result of the combination to the logical endpoints, according to a sequence determined based on the corrected frame numbers.

Disclosed embodiments may be implemented as an S/W program including instructions stored in a non-transitory computer-readable storage media.

A computer is a device capable of calling stored instructions from a recording medium and operating according to a disclosed embodiment according to the called instructions, and may include terminal devices and remote control devices according to disclosed embodiments.

A computer-readable storage medium may be provided as a non-transitory storage medium, where 'non-transitory' refers to the storage medium being tangible and not including a signal, but does not distinguish whether data is stored semi-permanently or temporarily in the storage medium.

Electronic devices or operation methods thereof according to embodiments of the disclosure may be provided by being included in a computer program product. The computer program product, which is a commodity, may be traded between sellers and buyers.

The computer program product may include a software program and a computer-readable storage medium having the software program stored thereon. For example, the computer program product may include a product in the form of a software program (e.g., a downloadable app) that is electronically distributed through the manufacturer of an electronic device or an electronic market. For electronic distribution, at least a portion of the software program may be stored on a storage medium or may be created temporarily. In this case, the storage medium may be a server of a manufacturer, a server of an electronic market, or a storage medium of a relay server for temporarily storing an SW program.

The computer program product may include a storage medium of a server or a storage medium of a terminal in a system including the server and the terminal (e.g., a TV, a computer, and a wireless communication module). Alternatively, if there is a third device (e.g., a computer or a smartphone) in communication with the server or terminal, the computer program product may include a storage medium of the third device. Alternatively, the computer program product may include the S/W program itself transmitted from the server to the terminal or the third device, or transmitted from the third device to the terminal.

In this case, one of the server, the terminal, and the third device may execute the computer program product to perform the methods according to the disclosed embodiments. Alternatively, at least two of the server, the terminal, and the third device may execute the computer program product to distribute and perform the methods according to the disclosed embodiments.

For example, a server (e.g., a cloud server or an AI server) may execute a computer program product stored on a server to control a terminal communicating with the server to perform the methods according to the disclosed embodiments. As another example, a third device may execute a computer program product to control a terminal in communication with the third device to perform the methods according to the disclosed embodiments.

When the third device executes the computer program product, the third device may download the computer program product from the server and execute the downloaded computer program product. Alternatively, the third device may execute a computer program product provided in a preloaded state to perform methods according to the disclosed embodiments.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A host device for communicating with an electronic device, the host device comprising:
   a plurality of communication interfaces comprising a plurality of universal serial bus (USB) host controllers for communicating with the electronic device through a plurality of USB buses;
   memory storing one or more instructions; and
   at least one processor including processing circuitry,
   wherein the one or more instructions, when executed, configure the at least one processor to individually or collectively cause the host device to perform operations comprising:
      obtaining, from the plurality of USB host controllers, information about a plurality of physical endpoints that each of the plurality of USB host controllers uses for communication;
      configuring one or more logical endpoints, based on the information about the plurality of physical endpoints, wherein the logical endpoints are configured such that at least one logical endpoint is mapped to the plurality of physical endpoints including at least one physical endpoint that each of two or more different USB host controllers uses; and
      performing communication with the electronic device through the plurality of physical endpoints of the plurality of USB host controllers by controlling the plurality of USB host controllers through the logical endpoints,
      wherein the one or more logical endpoints are configured with a number of logical endpoints different from the plurality of physical endpoints, based on the information about the plurality of physical endpoints.

2. The host device of claim 1,
   wherein the plurality of USB host controllers and one predetermined application can communicate with each other through the logical endpoints, and
   wherein the one or more instructions, when executed, configure the at least one processor individually or collectively to cause the host device to perform operations comprising:
      combining data respectively received from the plurality of USB host controllers through the plurality of physical endpoints with each other and transmit a result of the combining to the predetermined application through the logical endpoints; or
      multiplexing data received from the predetermined application through the logical endpoints and transmitting a result of the multiplexing to the plurality of USB host controllers through the plurality of physical endpoints.

3. The host device of claim 2, wherein
   the predetermined application comprises a main driver configured to control communication according to a USB protocol, and
   the instructions, when executed, configure the at least one processor to cause the electronic device to perform operations comprising configuring the logical endpoints, based on the information about the plurality of physical endpoints, and control a gadget driver so that the plurality of USB host controllers communicate with the main driver through the logical endpoints, so that the main driver operates as if communicating with the electronic device through one USB bus.

4. The host device of claim 1, wherein the one or more instructions, when executed, configured the at least one processor individually or collectively to perform operations comprising:
   identifying the plurality of USB host controllers connected to the electronic device through the plurality of USB buses, and
   obtaining, from the identified plurality of USB host controllers, information about at least one physical endpoint that each of the plurality of USB host controllers uses for communication.

5. The host device of claim 1, wherein the information about the plurality of physical endpoints comprises information about a number of at least one endpoint, a data transmission direction of the at least one endpoint, and a transmission type of the at least one endpoint, used for communication by each of the plurality of USB host controllers.

6. The host device of claim 1, wherein, when configuring the logical endpoints, based on the information about the plurality of physical endpoints, the instructions, when executed, configure the at least one processor individually or collectively to cause the electronic device to perform operations comprising configuring the logical endpoints such that physical endpoints having same transmission directions and same transmission types among the physical endpoints used by the two or more different USB host controllers are mapped to one logical endpoint.

7. The host device of claim 1, wherein
the plurality of USB host controllers respectively assign frame numbers to data output through one or more physical endpoints at predetermined time intervals, and
the instructions, when executed, configure the at least one processor individually or collectively to cause the electronic device to perform operations comprising:
obtaining a frame number difference between data respectively received from the plurality of USB host controllers;
correcting the frame numbers assigned to the data respectively received from the plurality of USB host controllers, based on the frame number difference; and
combining the data respectively received through the physical endpoints of the plurality of USB host controllers with each other and output a result of the combining to the logical endpoints, according to a sequence determined based on the corrected frame numbers.

8. The host device of claim 1, wherein the instructions, when executed, configure the at least one processor to cause the electronic device to perform operations comprising:
receiving data including a plurality of packets from the electronic device through each of the plurality of USB host controllers, obtaining frame numbers assigned to the data from Start Of Frame (SoF) packets included in the plurality of packets at predetermined time intervals, and obtaining, from data packets included between the SoF packets, information about one or more physical endpoints to which the data packets are transmitted; and
arranging and outputting the data packets, based on the frame numbers, through a logical endpoint to which the one or more physical endpoints are mapped.

9. The host device of claim 1, wherein the instructions, when executed, configure the at least one processor to individually or collectively cause the host device to perform operations comprising configuring the one or more logical endpoints according to a transmission bandwidth or an amount of transmission data.

10. A method, performed by a host device, of performing communication with an electronic device, the method comprising:
connecting with the electronic device through a plurality of USB buses;
obtaining information about a plurality of physical endpoints that each of a plurality of USB host controllers connected with the plurality of USB buses uses for communication, from the plurality of USB host controllers;
configuring one or more logical endpoints, based on the information about the plurality of physical endpoints, wherein the logical endpoints are configured such that at least one logical endpoint is mapped to the plurality of physical endpoints including at least one physical endpoint that each of two or more different USB host controllers uses; and
performing communication with the electronic device through the plurality of physical endpoints of the plurality of USB host controllers by controlling the plurality of USB host controllers through the logical endpoints,
wherein the configuring of the one or more logical endpoints comprises configuring a different number of logical endpoints than the plurality of physical endpoints, based on the information about the plurality of physical endpoints.

11. The method of claim 10, wherein the plurality of USB host controllers and one predetermined application can communicate with each other through the logical endpoints, and
the performing of the communication with the electronic device comprises:
combining data respectively received from the plurality of USB host controllers through the plurality of physical endpoints with each other and transmitting a result of the combining to the predetermined application through the logical endpoints; and
multiplexing data received from the predetermined application through the logical endpoints and transmitting a result of the multiplexing to the plurality of USB host controllers through the plurality of physical endpoints.

12. The method of claim 10, wherein the obtaining of the information about the plurality of physical endpoints comprises:
identifying the plurality of USB host controllers connected to the electronic device through the plurality of USB buses; and
obtaining, from the identified plurality of USB host controllers, information about at least one physical endpoint that each of the plurality of USB host controllers uses for communication.

13. The method of claim 10, wherein the information about the plurality of physical endpoints comprises information about a number of at least one endpoint, a data transmission direction of the at least one endpoint, and a transmission type of the at least one endpoint, used for communication by each of the plurality of USB host controllers.

14. The method of claim 10, wherein the configuring of the logical endpoints comprises configuring the logical endpoints such that physical endpoints having same transmission directions and same transmission types among the physical endpoints used by the two or more different USB host controllers are mapped to one logical endpoint.

15. A non-transitory computer-readable recording medium having stored therein a program, which, when executed by a computer, causes a host device to perform operations for communication with an electronic device, the operations comprising:
connecting with the electronic device through a plurality of USB buses;
obtaining information about a plurality of physical endpoints that each of a plurality of USB host controllers connected with the plurality of USB buses uses for communication, from the plurality of USB host controllers;
configuring one or more logical endpoints, based on the information about the plurality of physical endpoints, wherein the logical endpoints are configured such that at least one logical endpoint is mapped to the plurality of physical endpoints including at least one physical endpoint that each of two or more different USB host controllers uses; and performing communication with the electronic device through the plurality of physical endpoints of the plurality of USB host controllers by controlling the plurality of USB host controllers through the logical endpoints,
wherein the configuring of the one or more logical endpoints comprises configuring a different number of logical endpoints than the plurality of physical endpoints, based on the information about the plurality of physical endpoints.

* * * * *